United States Patent
Polaganga et al.

(10) Patent No.: US 12,413,954 B2
(45) Date of Patent: Sep. 9, 2025

(54) SYSTEMS AND METHODS FOR ROAMING USER EQUIPMENT MANAGEMENT SERVICES FOR WIRELESS COMMUNICATIONS NETWORKS

(71) Applicant: T-MOBILE INNOVATIONS LLC, Overland Park, KS (US)

(72) Inventors: Roopesh Kumar Polaganga, Bothell, WA (US); Meenakshi Dhar, Bellevue, WA (US); Thomas Power Lucht, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 285 days.

(21) Appl. No.: 18/188,851

(22) Filed: Mar. 23, 2023

(65) Prior Publication Data
US 2024/0323666 A1  Sep. 26, 2024

(51) Int. Cl.
*H04W 8/12* (2009.01)
*H04W 24/08* (2009.01)
*H04W 84/04* (2009.01)

(52) U.S. Cl.
CPC .......... *H04W 8/12* (2013.01); *H04W 24/08* (2013.01); *H04W 84/042* (2013.01)

(58) Field of Classification Search
CPC ..... H04W 8/12; H04W 24/08; H04W 84/042; H04W 24/10; H04W 24/02; H04W 84/06
USPC ...................................................... 455/432.1
See application file for complete search history.

(56) References Cited

U.S. PATENT DOCUMENTS

| | | | |
|---|---|---|---|
| 10,805,850 B1* | 10/2020 | Benammar | H04W 36/144 |
| 2020/0178135 A1* | 6/2020 | Yun | H04W 36/0061 |
| 2022/0256631 A1* | 8/2022 | Jain | H04W 76/15 |
| 2022/0345961 A1* | 10/2022 | Tao | H04W 56/0005 |

(Continued)

FOREIGN PATENT DOCUMENTS

WO   2005/032170 A2   4/2005

OTHER PUBLICATIONS

Gran, Ben, "What is Data Roaming?" SatlliteInternet.com, https://www.satelliteinternet.com/resources/what-is-data-roaming/, Jan. 12, 2023, 10 Pages.

(Continued)

*Primary Examiner* — Juan A Torres
(74) *Attorney, Agent, or Firm* — Shook, Hardy & Bacon L.L.P.

(57) ABSTRACT

Systems and methods for roaming user equipment (UE) management services for wireless communications networks are provided. In some embodiments, a roaming UE may be triggered to initiate a PLMN search based on leveraging geolocation based technology that determines when a roaming UE presently attached to a base station has entered a geographical area where coverage from a terrestrial base station may be available. The base station may track the location of the roaming UE, and correlate the location of the roaming UE to a coverage bin of the terrestrial coverage heat map. If the roaming UE is located within a coverage bin that is flagged as having terrestrial coverage available, the base station may perform one or more operations to trigger the UE to proceed to initiate a PLMN search, and perform an attach procedure to a base station having an identified higher priority PLMN.

20 Claims, 7 Drawing Sheets

(56) References Cited

U.S. PATENT DOCUMENTS

| | | | | |
|---|---|---|---|---|
| 2023/0268990 | A1* | 8/2023 | Sharma | H04B 7/18532 |
| | | | | 455/427 |
| 2023/0292210 | A1* | 9/2023 | Choi | H04W 36/00698 |
| 2023/0362640 | A1* | 11/2023 | Edge | H04W 12/06 |
| 2024/0098597 | A1* | 3/2024 | Lee | H04W 36/14 |
| 2024/0267808 | A1* | 8/2024 | Ji | H04B 7/18541 |
| 2024/0284189 | A1* | 8/2024 | Aksu | H04W 16/14 |

OTHER PUBLICATIONS

Unknown, "USIM Paramters," ShareTechnote, https://sharetechnote.com/html/Handbook_LTD_USIM_Parameters.html, Downloaded Feb. 14, 2023, 4 Pages.

Unknown, Technical Specification, 5G; 5GS; User Equipment (UE) conformance specification; Part 1: Protocol (3GPP TS 38.523-1 version 15.3.0 Release 15), ETSI TS 138 523-1, V15.3.0, Section 6.1.1.1.2, May 2019, 7 Pages.

Flitton, Alex, "GPS Vs Cellular Locating Technology," Avantguard, https://www.agmonitoring.com/blog/industry-news/gps-vs-cellular-locating-technology, Jul. 17, 2018, 11 Pages.

Unknown, "PLMN Selection in LTE (Idle Mode Action)," Apr. 25, 2019, https://www.techplayon.com/plmn-selection-in-lte-idle-mode-action, 4 Pages.

Unknown, "5G & Non-Terrestrial Networks," A 5G Americas White Paper, Feb. 2022, 35 Pages.

Berger, Eric, "A Virginia company has connected mobile phones directly to satellites," ARS Technica, Sep. 29, 2021, 7 Pages.

* cited by examiner

SYSTEMS AND METHODS FOR ROAMING USER EQUIPMENT MANAGEMENT SERVICES FOR WIRELESS COMMUNICATIONS NETWORKS

BACKGROUND

Cellular user equipment (UE), such as cellular phones, are said to be "roaming" when they attach to a visitor public land mobile network (VPLMN), through which the UE can communicate with the operator core network of the home public land mobile network (HPLMN) to which the UE is a subscriber. Typically, a UE will perform a public land mobile network (PLMN) search to identify the availability of nearby base stations that belong to their HPLMN, and prioritize attaching to base stations of their HPLMN before attaching to a VPLMN base station via roaming. A roaming UE attached to a VPLMN may, when in idle mode, periodically attempt to search for nearby base stations that belong to their HPLMN, and attach directly with their HPLMN when such base stations are found. However, a roaming UE attached to a VPLMN in connected mode (e.g., with one or more active PDU sessions established), may remain attached to the VPLMN indefinitely, until connected mode is terminated and/or the UE returns to idle mode. Generally, base stations that identify as belonging to a HPLMN for a UE are terrestrial base stations. That is, they may be implemented as cell sites with antennas mounted to towers, buildings, or other terrestrial structures, for example. In recent years, non-terrestrial base stations (e.g., base stations implemented on Earth orbiting satellites) have also emerged as a technology to bring wireless connectivity services to UE located in geographic regions beyond the reach of terrestrial base station coverage areas, and/or to provide contingency wireless connectivity services to a region when terrestrial base stations become inoperable.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments of the present disclosure provide for, among other things, solutions that address the problem of delays in transferring cellular user equipment (UE) roaming on a non-terrestrial base station to a terrestrial base station. One or more embodiments of the present disclosure provide for, among other things, roaming UE management services that may be applied, for example, to trigger roaming UE to initiate a PLMN search and prompt the UE to move to a higher priority PLMN when such a higher priority PLMN is available. More specifically, a roaming UE may be triggered to initiate a PLMN search based on leveraging geolocation based technology that determines when a UE presently attached to a non-terrestrial base station has entered a geographical area where coverage from a terrestrial base station may be available.

The mobile operator of a terrestrial network of base station may generate a terrestrial coverage heat map comprising a geo-spatial coverage grid that includes a plurality of individual coverage bins. Coverage bins of the geo-spatial coverage grid where terrestrial network coverage is detected as being available may be flagged as terrestrial coverage available (TCA) coverage bins. The resulting terrestrial coverage heat map may be shared with the non-terrestrial network operator of a non-terrestrial base station. The non-terrestrial base station may track the location of a roaming UE, and correlate the location of the roaming UE to a coverage bin of the terrestrial coverage heat map. If the coverage bin correlating to the UE location is not flagged as having terrestrial coverage available, the non-terrestrial base station may permit the UE to maintain an attachment to the non-terrestrial base station, while it continues to track the location of the UE. In contrast, if the UE is located within a coverage bin that is flagged as having terrestrial coverage available, the non-terrestrial base station may perform one or more operations to trigger the UE to proceed to initiate a PLMN search, and perform an attach procedure to a base station having an identified higher priority PLMN.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
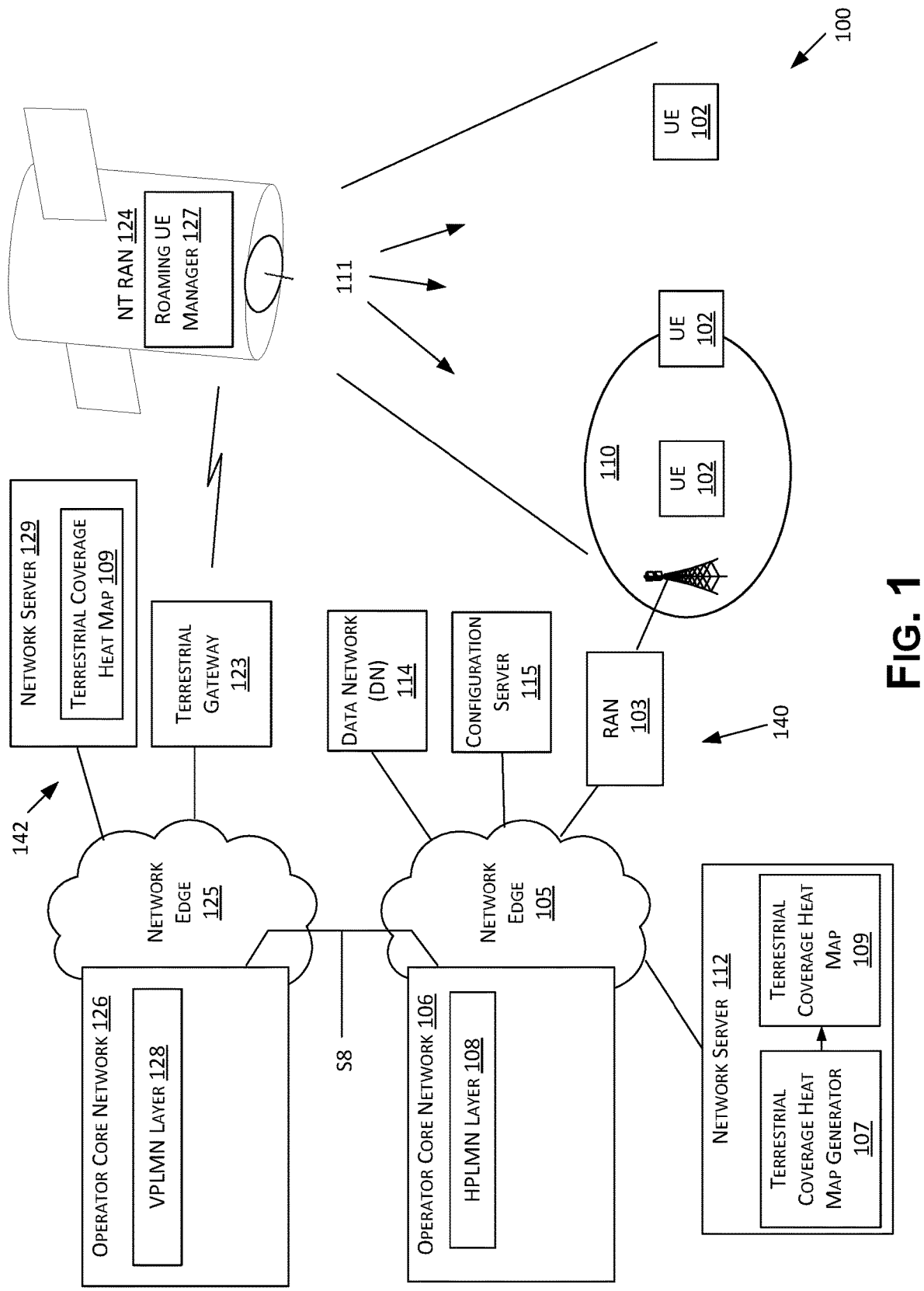
FIG. 1 is a diagram illustrating an example network environment implementing roaming UE management services, in accordance with some embodiments.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, solutions that address the problem of delays in transferring cellular user equipment (UE) roaming on a non-terrestrial base station to a terrestrial base station.

With technologies today, cellular user equipment (UE), such as cellular phones, may perform a public land mobile network (PLMN) search to identify the availability of nearby base stations that belong to their HPLMN, and prioritize attaching to base stations of their HPLMN over attaching to other base stations. Generally, the UE may comprise a subscriber identity module (SIM), which may be implemented within the UE as a SIM card, an embedded-SIM (eSIM) circuit, a universal subscriber identity module (USIM) circuit, or similar technology. The SIM may include a prioritized listing of several PLMN, that includes the PLMN identifier (e.g., a mobile country code MMC and/or mobile network code MNC) of PLMN that are compatible with the UE to provide wireless connectivity services. An HPLMN may represent the highest priority PLMN layer corresponding to the home network that the UE seeks to connect to. For example, a HPLMN may correspond to the mobile network that the UE is subscribed to and where the UE subscriber profile is configured and maintained. The HPLMN layer may comprise sub-priority PLMN sub-layers corresponding to different radio access technologies. For example, the HPLMN layer may comprise a 5G NR HPLMN sub-layer, a 4G LTE HPLMN sub-layer, a 3G HPLMN sublayer, and/or a 2G HPLMN sublayer, each ranked in order of priority. A UE that cannot attach to the 5G NR HPLMN sub-layer of its HPLMN may fall back to a lower priority sub-layer (e.g., to the 4G LTE HPLMN sub-layer) before attempting to attach to a non-HPLMN base station. Below the HPLMN layer in priority, the SIM may include PLMN identifiers for one or more equivalent PLMN (EPLMN) that may be considered functionally equivalent to the HPLMN in terms of service provisioning. An EPLMN may be operated by the same mobile operator as the HPLMN, or another mobile operator that has a collaborative agreement with the mobile operator of the HPLMN to provide wireless services to their UE. Like the HPLMN layer, an EPLMN layer may comprise sub-priority PLMN sub-layers corresponding to different radio access technologies. Below the EPLMN layer in priority, the SIM may include PLMN identifiers for one or more VPLMN that support roaming. When a UE attaches to a VPLMN, the UE is roaming on a network that provides accessibility to the services of their HPLMN via the VPLMN, but the UE's voice and/or data usage may be billed per agreement between the HPLMN and VPLMN network operators. Like the HPLMN layer, a VPLMN layer may comprise sub-priority PLMN sub-layers corresponding to different radio access technologies. In some embodiments, the SIM of a UE may define one or more other types of PLMN layers, which may also be ranked in order of priority with respect to the UE's base station attachment preference. In some embodiments, the network operator of the HPLMN may initiate an over-the-air reconfiguration of a UE's SIM to update the prioritized listing of PLMN, for example by reordering PLMN priorities, adding and/or removing PLMN from the prioritized listing of PLMN, and/or re-designating a new HPLMN.

However, a challenge emerges with currently available technologies when a roaming UE attaches to a VPLMN that is provided through a non-terrestrial base station (e.g., a base station hosted on an Earth orbiting satellite). For example, a mobile UE may initiate roaming to attach to a non-terrestrial based VPLMN in response to determining (e.g., based on radio frequency (RF) signal measurements) that no coverage from a higher priority terrestrial base station is present in the area where the UE is located. Under current technologies, once attached to the VPLMN, the UE will remain attached to the non-terrestrial base station for at least a predetermined time duration, which in some implementations may be no less than 6 minutes, but could be substantially longer. For example, when the UE is camped in idle mode on the VPLMN of a non-terrestrial base station, the UE waits for the predetermined time duration to expire before it performs a PLMN search to determine if the UE has entered a coverage area where a higher priority terrestrial base stations is present. If a higher priority terrestrial base station is detected, the UE may initiate a transfer process to attach to the PLMN available via that higher priority terrestrial base station. If a higher priority terrestrial base station is not detected, the UE may remain attached the non-terrestrial based VPLMN for another iteration of the predetermined time duration. Thus, even once the mobile UE enters a coverage area where the higher priority PLMN becomes available via a terrestrial base station, the UE may still have to wait for the expiration of the predetermined time duration before it proceeds to perform a PLMN search to identify that those terrestrial base stations have become available.

Such a delay may be problematic with respect to satellite communications where, inherently, the communication links between the UE and the non-terrestrial base station comprise low bandwidth channels at high latency (e.g., given that the uplink and downlink signals must travel between the UE and a satellite in low Earth orbit). Further, the coverage area provided by a non-terrestrial base station may extend over a very large geographical area relative to conventional terrestrial based macro base stations. For example, a coverage area of a non-terrestrial base station may provide wireless connectivity to UE in a region encompassing hundreds of square miles, whereas a coverage area for a conventional terrestrial macro base station may typically extend, for example 1 to 2 miles, from the base station antenna. The available bandwidth of the non-terrestrial base station for transporting UE communications traffic is therefore spread across a region potentially comprising a substantially larger number of UE (that each have a capacity to establish roaming attachments) than is the case for a terrestrial macro base station. The wireless connectivity available from the non-terrestrial base station thus generally constitutes a relatively scarce resource intended for use by UE where no other options are available. Each UE that attaches and/or camps on a non-terrestrial base station uses resources of the non-terrestrial base station (e.g., processing resources, power, and/or satellite link and/or backhaul bandwidth) that become unavailable to other UE. Moreover, a UE that attaches as a roaming UE to a non-terrestrial base station consumes battery power more quickly than a UE connected to a terrestrial base station, since transmission power needs to be boosted to transmit an uplink signal to the satellite. As such, a UE that remains camped on a VPLMN of a non-terrestrial base station when terrestrial base stations options are available represents a substantial inefficient use of network resources, that may also degrade the ability of the non-terrestrial base station to serve other UE that may need the network resources.

The problem of a roaming UE maintaining an unnecessary attachment to a VPLMN of a non-terrestrial base station becomes more evident with respect to a UE that maintains an active connected state while attached to the non-terrestrial base station. A roaming UE attached to a VPLMN in connected mode (e.g., with one or more active protocell data unit (PDU) sessions established), may remain attached to the VPLMN of the non-terrestrial base station indefinitely, even if the mobile UE enters a coverage area where the higher priority PLMN becomes available via a terrestrial base station. That is, a mobile UE located in a rural area may attach to VPLMN of a non-terrestrial base station when no other terrestrial base station are in range, and establish one or more active PDU sessions that keep the UE in connected mode (e.g., using an audio streaming service) even as the UE travels from the rural area into a city where abundant coverage from terrestrial base stations is available. In this scenario, the UE continues to unnecessarily consume the limited resources of the non-terrestrial base station as long as it remains in connected mode because there is currently no mechanism to trigger the UE to perform a PLMN search to determine when a non-terrestrial base station is available to serve the UE.

One or more embodiments of the present disclosure provide for, among other things, roaming UE management services that may be applied, for example, to trigger roaming UE to initiate a PLMN search and prompt the UE to move to a higher priority PLMN when such a higher priority PLMN is available. More specifically, a roaming UE may be triggered to initiate a PLMN search based on leveraging geolocation based technology that determines when a UE presently attached to a non-terrestrial base station has entered a geographical area where coverage from a terrestrial base station may be available.

In some embodiments, as explained in greater detail below, the mobile operator of a terrestrial network of base station generates a terrestrial coverage heat map comprising a geo-spatial coverage grid that includes a plurality of individual coverage bins. The individual coverage bins may each correspond to a geographical region of the Earth's surface. Coverage bins may be defined, for example, based on a geographical coordinate of a coverage bin center point (e.g., latitude and longitude), and a radius that indicates how far the boundary of a coverage bin extends from the center point. In some embodiments, a coverage bin may comprise the shape of a regular polygon, such as but not limited to a hexagonal polygon. For example, the geo-special coverage grid may comprise a hexagonal grid comprising a plurality of hexagonal polygons each corresponding to a different geographical region of the Earth's surface. In some embodiments, to generate the terrestrial coverage heat map, a server may aggregate RF signal measurement data and signal metrics from base stations that cover a region corresponding to the geo-special coverage grid, and/or from the operator network core, to determine which coverage bins have available terrestrial network coverage based on UE signal activity occurring within those coverage bins. Coverage bins of the geo-spatial coverage grid where terrestrial network coverage is detected as being available (e.g., determined as a function of UE signal activity), are flagged as terrestrial coverage available (TCA) coverage bins. The resulting terrestrial coverage heat map may be shared with the non-terrestrial network operator of the non-terrestrial base station, for example by transmitting the terrestrial coverage heat map to a server of the non-terrestrial network. In some embodiments, when a roaming UE is attached to the VPLMN provided by a non-terrestrial base station of the non-terrestrial network, the non-terrestrial base station may track the location of the roaming UE, and correlate the location of the roaming UE to a coverage bin of the terrestrial coverage heat map. If the coverage bin correlating to the UE location is not flagged as having terrestrial coverage available, the non-terrestrial base station may permit the UE to maintain an attachment to the non-terrestrial base station, while it continues to track the location of the UE. In contrast, if the UE is located within a coverage bin that is flagged as having terrestrial coverage available, the non-terrestrial base station may perform one or more operations (discussed in greater detail below) to trigger the UE to proceed to initiate a PLMN search. If the UE reports that it detects a higher priority PLMN than the VPLMN of the non-terrestrial base station, the UE is instructed to perform an attach procedure to the identified higher priority PLMN. As further discussed below, in some embodiments, triggering the UE to perform a PLMN search may comprise pushing a carrier configuration update message to the UE (e.g., communicated through the VPLMN of the non-terrestrial base station) which may initiate a PLMN search by the UE to search for a base station for its HPLMN in order to complete the carrier configuration update.

Advantageously, the operation of the non-terrestrial base station is improved by the roaming UE management services presented herein, because the non-terrestrial base station is enabled to redirect a roaming UE to attach to a terrestrial base station based on a detected availability of terrestrial coverage in an area where the UE is located. The roaming UE management services realizes an improvement to non-terrestrial base station's ability to perform capacity management because its resources are conserved for the use of UE that have no alternative, and/or need it most. A corresponding benefit is realized with respect to minimizing interference between terrestrial & non-terrestrial wireless communications networks. That is, when a UE is attached to a non-terrestrial base station, the downlink signal from the satellite is transmitted over a wide area-creating potential interference for UE attached to terrestrial base stations sharing the same frequency band. Reducing unnecessary UE attachments to a non-terrestrial base station reduces the opportunity for such interference to occur. From the UE perspective, the end user experience is improved because the UE is not unnecessarily latched onto the low throughput, high latency, communications link of a non-terrestrial base station, but can readily shift to a substantially shorter communications link of a relatively closer terrestrial base station without undue delay to realize operational improvements with respect to throughput and latency. Moreover, because a UE boosts uplink signal power to establish a communications link with an orbiting base station, such communications links consume more battery power than communication links with terrestrial base stations. With the embodiments of roaming UE management services presented herein, the UE may benefit from improved battery life by limiting non-terrestrial network connections when not needed. It should be appreciated that although the embodiments discussed herein generally describe roaming UE management services with respect to managing roaming UE attached to a non-terrestrial base station, the embodiments described herein may also be implemented in the context of managing roaming UE attached to a terrestrial base station, where it is desired to avoid undue delays in transferring a roaming UE. As such, with respect to various example embodiments described herein, other embodiments may include such embodiments where a terrestrial base station (e.g., RAN) is in place of the illustrated non-terrestrial base station (e.g., NT RAN), to practice the described roaming UE management services.

FIG. 1 is a diagram illustrating an example network environment 100 embodiment in which aspects of roaming UE management services, may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises a first operator core network 106 (also referred to as a "core network") of a terrestrial network 140 that provides one or more wireless network services to one or more UE 102 within a coverage area 110 of at least one base station 103.

In the embodiment illustrated in FIG. 1, base station 103 may comprise a terrestrial base station that implements a macro radio access network (RAN).

UE 102 may in general, comprise forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 102 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 102 may include both mobile UE and stationary UE. The UE 102 can include one or more processors, and one or more non-transient computer-readable media for executing code to carry out the functions of the UE 102 described herein. The computer-readable media may include computer-readable instructions executable by the one or more processors. In some embodiments, the UE 102 may be implemented using a computing device 600 as discussed below with respect to FIG. 6.

In particular, operator core network 106 provides combinations of network services to UE 102 for at least one home public land mobile network (HPLMN) which in FIG. 1 is represented as core network HPLMN layer 108. In some embodiments, the operator core network 106 may comprises a multi-operator core network (MOCN) of which comprises multiple PLMNs to provide services to different sets of UE 102.

Base stations such as base station 103 are often individually referred to as a radio access network (RAN) 103 and/or a wireless communication base station system. A RAN 103 may function as an access node via which the UE 102 within coverage area 110 can wirelessly access services of the operator core network 106, such as telecommunications and data connectivity. In the context of fourth generation (4G) Longer Term Evolution (LTE), a RAN 103 may be referred to as an eNodeB, or eNB. In the context of fifth generation (5G) New Radio (NR), a RAN 103 may be referred to as a gNodeB, or gNB). Other terminology may also be used depending on the specific implementation technology. As such, in some embodiments network environment 100 comprises, at least in part, a wireless communications network. In this disclosure, RAN 103 may also more generally be referred to as a macro RAN (which may also be referred to as a macro access node, macrocell, and/or macro base station). In general, a macro RAN typically comprises arrays of tower or building mounted antenna that provide a coverage area that may extend, for example, one to several miles or more. Moreover, a macro RAN may utilize lower frequency bands (in addition to, or instead of, other frequency bands) that tend to penetrate the walls of buildings and other structure better than, for example, mid-band and high-band frequencies.

In some embodiments, RAN 103 may comprise a multi-modal network (for example comprising one or more multi-modal access devices) where multiple radios supporting different systems are integrated into the radio of the RAN 103. Such a multi-modal RAN 103 may support a combination of 3GPP radio technologies (e.g., 4G, 5G and/or 6G) and/or non-3GPP radio technologies. The HPLMN layer 108 may comprise PLMN sub-layers corresponding to such radio technologies.

In particular, individual UE 102 may communicate with the operator core network 106 via a RAN 103 over one or both of uplink (UL) RF signals and downlink (DL) RF signals. In some embodiments, RAN 103 may include an interface to provide connectivity to the HPLMN layer 108 for UE 102 that belong to that HPLMN. In some embodiments, each PDU session between the UE 102 and the operator core network 106 through the RAN 103 may be associated with a network slice and/or assigned a single network slice selection assistance information (S-NSSAI) identifier that may be unique within the context of the HPLMN layer 106. In some embodiments, RAN 103 may broadcast a system information block (SIB) comprising the PLMN identity of HPLMN layer 108.

The RAN 103 may be coupled to the operator core network 106 via a core network edge 105 that comprises wired and/or wireless network connections that may themselves include wireless relays and/or repeaters. In some embodiments, a RAN 103 is coupled to the operator core network 106 at least in part by a backhaul network such as the Internet or other public or private network infrastructure. The core network edge 105 may comprise one or more network nodes or other elements of the operator core network 106 that may define the boundary of the operator core network 106 and may serve as the architectural demarcation point where the operator core network 106 connects to other networks such as, but not limited to RAN 103, the Internet, or other third-party networks. It should be understood that in some aspects, the network environment 100 may not comprise a distinct network operator core network 106, but rather may implement one or more features of the network operator core network 106 within other portions of the network, or may not implement them at all, depending on various carrier preferences.

As shown in FIG. 1, network environment 100 further comprises a second operator core network 126 of a non-terrestrial network 142 that provides one or more wireless network services to one or more UE 102 within a coverage area 111 of at least one non-terrestrial base station 124. In particular, operator core network 126 provides combinations of network services to UE 102 for at least one visited public land mobile network (VPLMN) which in FIG. 1 is represented as core network VPLMN layer 128. In some embodiments, the operator core network 126 may comprises a multi-operator core network (MOCN) of which comprises multiple PLMNs to provide services to different sets of UE 102.

Non-terrestrial base stations such as non-terrestrial base station 124 may also be referred to as a non-terrestrial radio access network (NT RAN) 124 and/or a non-terrestrial wireless communication base station system. In some embodiments, the NT RAN 124 may be hosted on a space-based vehicle such, but not limited to, a satellite designed for travelling in a low Earth orbit. NT RAN 124 may function as an access node via which roaming UE 102 (e.g., UE 102 that have HPLMN layer 108 as their home PLMN) within coverage area 111 can wirelessly access services of the VPLMN layer 128 and/or reach services of the operator core network 106 and/or HPLMN layer 108, such as telecommunications and data connectivity.

For example, when a roaming UE 102 connects to the VPLMN layer 128 (via NT RAN 124), the UE 102 may register with the Access and Mobility Management Function (AMF) of the visited operator core network 126. The AMF may control the Network Repository Function (NRF) of operator core network 126 to query the NRF of the operator core network 106 (the home network of UE 102) to find the Authentication Server Function (AUSF) and Unified Data Management (UDM) of the operator core network 106 to authenticate and register UE 102. In some embodiments, the operator core network 106 and operator core network 126 may communicate through at least one channel, such as but not limited to an S8 interface established between the two core networks. For example, an S8 interface may be used to route user traffic, related signaling, and/or other communications between VPLMN layer 128 and HPLMN layer 108, and/or other communications between the core networks. In the context of fourth generation (4G) Longer Term Evolution (LTE), the NT RAN 124 may be referred to as an eNodeB, or eNB. In the context of fifth generation (5G) New Radio (NR), the NT RAN 124 may be referred to as a gNodeB, or gNB. Other terminology may also be used depending on the specific implementation technology. In some embodiments, NT RAN 124 may comprise a multi-modal network (for example comprising one or more multi-modal access devices) where multiple radios supporting different systems are integrated into the radio of the NT RAN 124. Such a multi-modal NT RAN 124 may support a combination of 3GPP radio technologies (e.g., 4G, 5G and/or 6G) and/or non-3GPP radio technologies. In some embodiments, the VPLMN layer 128 may comprise PLMN sub-layers corresponding to such radio technologies.

In particular, individual roaming UE 102 may communicate with the operator core network 126 via NT RAN 124 over one or both of uplink (UL) RF signals and downlink (DL) RF signals. In some embodiments, NT RAN 124 may include an interface to provide connectivity to the VPLMN layer 128 for roaming UE 102. In some embodiments, each PDU session between the UE 102 and the operator core network 126 through the NT RAN 124 may be associated with a network slice and/or assigned a single network slice selection assistance information (S-NSSAI) identifier that may be unique within the context of the VPLMN layer 128. In some embodiments, NT RAN 124 may broadcast a system information block (SIB) comprising the PLMN identity of VPLMN layer 128.

In some embodiments, the NT RAN 124 may be coupled to the operator core network 126 via a core network edge 125 that comprises wired and/or wireless network connections that may themselves include wireless relays and/or repeaters. In some embodiments, the NT RAN 124 may be coupled to with the operator core network 126 and/or core network edge 125 through a terrestrial gateway 123 that comprises a satellite transponder station that communicates with the NT RAN 124 using radio frequency uplink and downlink satellite communication links. In some embodiments, terrestrial gateway 123 may be coupled to the operator core network 126 at least in part by a backhaul network such as the Internet or other public or private network infrastructure. The core network edge 125 may comprise one or more network nodes or other elements of the operator core network 126 that may define the boundary of the operator core network 126 and may serve as the architectural demarcation point where the operator core network 126 connects to other networks such as, but not limited to NT RAN 124, the Internet, or other third-party networks. It should be understood that in some aspects, the network environment 100 may not comprise a distinct network operator core network 126, but rather may implement one or more features of the network operator core network 126 within other portions of the network, or may not implement them at all, depending on various carrier preferences.

In some embodiments, the NT RAN 124 is deployed as fallback solution to provide cellular services to a UE 102 that otherwise has no access (or at least no reliable access) to cellular services from a terrestrial base station, such as RAN 103. As such, in some embodiments, NT RAN 124 may provide UE 102 with access to a more limited set of PLMN than RAN 103. For example, in some embodiments, an NT RAN 124 may be dedicated to providing wireless service to roaming UE 102 through one or more VPLMN (such as VPLMN 128). In other embodiments, NT RAN 124 may further include non-roaming access to other PLMN.

The network environment 100 is generally configured for wirelessly connecting UEs 102 to other UEs 102 via RAN 103, via NT RAN 124, via other RAN and/or other local wireless cellular access points, and/or via other telecommunication networks or a publicly-switched telecommunication network (PSTN), for example. The network environment 100 may be generally configured for wirelessly connecting a UE 102 to data or services that may be accessible on one or more application servers or other functions, nodes, or servers. The operating environment 100 may be generally configured, in some embodiments, for wirelessly connecting UE 102 to data or services that may be accessible on one or more application servers or other functions, nodes, or servers (such as services provided by servers of a data network (DN) 114 for example).

As discussed above, in some embodiments, the network environment 100 may provide roaming UE management services that address the problem of delays in transferring a UE 102 roaming on the NT 124 from transferring to an available terrestrial base station, such a RAN 103. To this end, the terrestrial network 140 of operator core network 106 may include at least one network server 112 that comprises a terrestrial coverage heat map generator 107 to produce a terrestrial coverage heat map 109. The terrestrial coverage heat map 109 comprises a geo-spatial coverage grid that includes a plurality of individual coverage bins that include regions served by the operator core network 106 through coverage areas of one or more terrestrial base stations, such as RAN 103. As further discussed below with respect to FIG. 2, the terrestrial coverage heat map generator 107 may aggregate RF signal measurement data and signal metrics which may be collected from base stations of operator core network 106 that cover the geo-special coverage grid, and/or from the operator core network. Based on the aggregate information, the terrestrial coverage heat map generator 107 may determine which coverage bins of the terrestrial coverage heat map 109 have available terrestrial network coverage based on UE signal activity occurring within the area of those coverage bins. Although the FIG. 1 illustrates the network server 112 as a distinct node of terrestrial network 140, it should be understood that in some embodiments, the functions of the network server 112 and/or the terrestrial coverage heat map generator 107 described herein may be distributed network nodes. For example, on or more aspects of the terrestrial coverage heat map generator 107 described herein may be implemented at least in part by processing components of the operator core network 106 and/or one or more base stations, such as RAN 103. In some embodiments, the server 112 and/or terrestrial coverage heat map generator 107 may be implemented at least in part using a computing device 600 as discussed below with respect to FIG. 6, and/or a cloud computing platform 710 as discussed below with respect to FIG. 7.

The resulting terrestrial coverage heat map 109 may be transmitted to a network server 129 of the non-terrestrial network 142, where it is available to a roaming UE manager 127 executed by the NT RAN 124. For example, in some embodiments, the terrestrial coverage heat map generator 107 may periodically (e.g., on a daily basis) transmit a copy of the terrestrial coverage heat map 109 to server 129. The roaming UE manager 127 of the NT RAN 124 may then periodically obtain the terrestrial coverage heat map 109 from network server 129 to implement one or more roaming visitor management processes. For example, the roaming UE manager 127 may track the location of a roaming UE 102 and correlate the location of the roaming UE to a coverage bin of the terrestrial coverage heat map 109. If the coverage bin correlating to the location of that UE 102 is not flagged by the terrestrial coverage heat map 109 as having terrestrial coverage available, the roaming UE manager 127 may permit the UE 102 to maintain an attachment to the NT RAN 124. When the UE 102 moves into a location corresponding to a coverage bin that is flagged as having terrestrial coverage available, the roaming UE manager 127 may execute one or more operations to trigger the UE 102 to proceed to initiate a PLMN search. If the UE 102 reports that it detects a higher priority PLMN than the VPLMN 128, the UE 102 is instructed to perform an attach procedure to the identified higher priority PLMN. For example, the UE 102 may detect the availability of HPLMN 108 and therefore detach from VPLMN 128 via NT RAN 124 and attach to HPLMN 108 via RAN 103.

Figure 2:
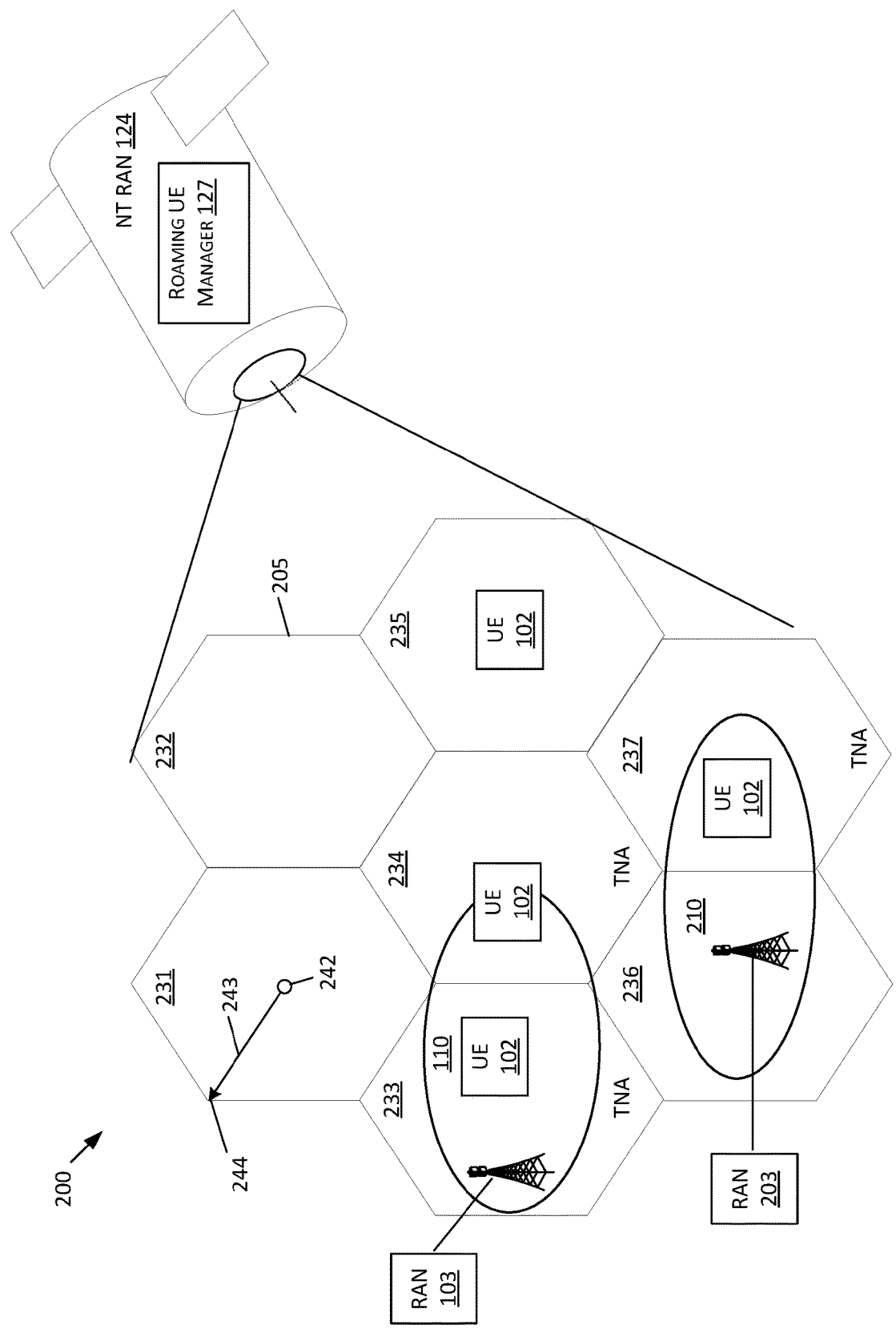
FIG. 2 is a diagram illustrating an example implementation of a terrestrial coverage heat map, in accordance with some embodiments.

Referring now to FIG. 2, FIG. 2 is a diagram illustrating implementation of a terrestrial coverage heat map 200, such as terrestrial coverage heat map 109 generated by terrestrial coverage heat map generator 107. In some embodiments, the geographical region corresponding to terrestrial coverage heat map 200 at least partially overlaps with the coverage area 111 of the NT RAN 124. As shown in FIG. 2, the terrestrial coverage heat map 200 may comprise a geo-spatial coverage grid 205 that includes a plurality of coverage bins (shown at 231 to 237). Each coverage bin corresponds to a geographic area. For example, as shown at 231, the terrestrial coverage heat map generator 107 may define the geographic area of a coverage bin based on geographic coordinates of a center point 242 of the coverage bin. In some embodiments, coverage bins may be uniform in size across a geo-spatial coverage grid 205 so that defining the coordinates of a center point 242 of each coverage bin is sufficient to define the geographic area corresponding to each coverage bin of the terrestrial coverage heat map 200. In other embodiments, the coverage bins may be non-uniform in size. In such embodiments, the terrestrial coverage heat map 200 may include a definition for each coverage bin that includes both a location (e.g., center point coordinates) and an indication of bin size (e.g., a radius 243 from the center point to a vertex 244 of the coverage bid).

With the structure of the terrestrial coverage heat map 200 and the geo-spatial coverage grid 205 defined, the terrestrial coverage heat map generator 107 collects usage data corresponding to UE signal activity detected within the coverage bin, and assigns a value to each coverage bin indicating whether or not access to a terrestrial network base station is available to a UE located within the geographic area of each respective bin. For example, in FIG. 2, coverage bins of terrestrial coverage heat map 200 where a terrestrial network base station is detected as available (for example, coverage bins 233, 234 and 237 in FIG. 2) may be assign a value (such as "1") denoting that a terrestrial network available (TNA) flag is set for that coverage bin. Conversely, coverage bins of terrestrial coverage heat map 200 where a terrestrial network base station is not detected as available (for example, coverage bins 231, 232, 235 and 236 in FIG. 2) may be assign a value (such as "0") denoting that a terrestrial network available (TNA) flag is not set for that coverage bin.

In some embodiments, the terrestrial coverage heat map generator 107 may collect UE usage data corresponding to UE signal activity a terrestrial network base station is available to a UE located within the geographic area of each respective bin. In some embodiments, the terrestrial coverage heat map generator 107 may determine when one or more UE 102 located within a coverage bin are attached to a terrestrial base station (such as RAN 103 and 203 shown in FIG. 2) based on detected terrestrial network 140 resource usage by such UE 102. For example, the terrestrial coverage heat map generator 107 may evaluate key performance indicator (KPI) measurements, for example, based on call trace data, per call measurement data (PCMD), active session statistics, RF signal measurement reports and/or voice quality metrics, obtained from the operator core network 106 and from the UE 102, for one or more radio access technologies layers. In some embodiments, KPI measurements and/or other usage data corresponding to UE signal activity (in terms of usage and/or interference) may be processed by the terrestrial coverage heat map generator 107 using a classification algorithm to evaluate UE signal activity within a cover bin to determine if the coverage bin should be classified as a terrestrial network available cover bin (e.g., such as, but not limited to, an artificial intelligence model trained to infer when a coverage bin is a terrestrial network available cover bin based on UE signal activity). That is, in some embodiments, the terrestrial coverage heat map generator 107 may generates terrestrial coverage heat maps 200 for individual radio access technologies layers supported by the terrestrial network 140. With respect to determining the location of UE usage of terrestrial network 140 resources, in some embodiments UE usage is associated with coverage bin location based on network based RF signal triangulation techniques, such as by measuring the timing and angle of arrival of an RF signal from a UE 102 and computing a location of a UE 102 with respect to the location of coverage bins of the geo-spatial coverage grid 205 from those measurements. In some embodiments, a location of a UE 102 with respect to the location of coverage bins of the geo-spatial coverage grid 205 may further, or instead, be determined based on GPS location information provided by the UE 102.

In some embodiments, the terrestrial coverage heat map generator 107 may compute a usage heat map of UE usage of the based on the aggregated UE network usage and location data. For example, the terrestrial coverage heat map generator 107 may compute a coverage confidence value for each coverage bin based on the collected UE usage data corresponding to UE signal activity, and produce a usage heat map where coverage bins are flagged as terrestrial coverage available (TCA) coverage bins based on the coverage confidence value exceeding a threshold. The terrestrial coverage heat map generator 107 may generate the terrestrial coverage heat map 109 from that usage heat map. In some embodiments, the terrestrial coverage heat map generator 107 may further incorporate RF signal interference information to construct the terrestrial coverage heat map 109. For example, the measurement of RF interference between terrestrial and non-terrestrial RF signals within the area of a coverage bin (e.g., above a predetermined threshold) may be an indication that UE 102 within that coverage bin may be exposed to both terrestrial network base station signals and signals from the NT RAN 124. Little or no measured RF interference by UE within the area of a coverage bin (e.g., below a predetermined threshold) may be an indication that only NT RAN 124 coverage is available within that coverage bin. Moreover, substantially high levels of measured RF interference by UE within the area of a coverage bin (e.g., above a predetermined threshold) may indicate that terrestrial network coverage exists within that coverage bin, but that UE 102 in that area may experience difficulty with respect to actually utilizing those terrestrial network 140 resources. In some embodiments, the terrestrial coverage heat map generator 107 may produce an interference heat map that correlates interference measurements with locations of UE 102 and thereby associating those interference measurements with coverage bins. The terrestrial coverage heat map generator 107 generate the terrestrial coverage heat map 109 based on coverage confidence values computed from both UE usage and measured interference factors. For example, the terrestrial coverage heat map generator 107 may generate the terrestrial coverage heat map 109 based on adjusting the usage overage confidence values represented by coverage bins of the usage heat map of UE usage using measured interference factors from the interference heat map. Those coverage bins of the terrestrial coverage heat map 109 comprising coverage confidence values greater than a predetermined threshold may be flagged as terrestrial coverage available (TCA) coverage bins.

To further illustrate generation of a terrestrial coverage heat map by a terrestrial coverage heat map generator 107, FIG. 2 illustrates the RAN 103 of terrestrial network 140 having a coverage area 110 that covers two coverage bins shown at 233 and 234. In this example, terrestrial network 140 further includes a RAN 203 (such as described with respect to RAN 103) having a coverage area 210 that covers two coverage bins as shown at 236 and 237.

In this example, there are no operating UE 102 within the geographic area corresponding to the two coverage bins 231 and 232. When the terrestrial coverage heat map generator 107 aggregates RF signal measurement data and signal metrics from base stations of operator core network 106, it will find no UE signal activity (either in terms of usage or interference) from any UE 102 located within coverage bins 231 and 232 and therefore will not flag those coverage bins as terrestrial coverage available (TCA) coverage bins. Referring to the coverage bin 235, this bin does include a UE 102 that has attached to the NT RAN 124. Here, when the terrestrial coverage heat map generator 107 aggregates RF signal measurement data and signal metrics from base stations of operator core network 106, it will find no UE signal activity (either in terms of usage or interference) from any UE 102, because this UE 102 is not attached to any base stations of operator core network 106. Furthermore, in this coverage bin 235, no other UE 102 is attached to any base station of operator core network 106. Therefore, terrestrial coverage heat map generator 107 will not flag coverage bin 235 as a terrestrial coverage available (TCA) coverage bin.

Referring to the coverage bins 233 and 234, each of these bins do include a UE 102 that is located within the coverage area 110 of RAN 103, and for the purpose of this example are considered as attached to their HPLMN 108 via RAN 103. When the terrestrial coverage heat map generator 107 aggregates RF signal measurement data and signal metrics from base stations of operator core network 106, it will find UE signal activity (in terms of usage and/or interference) from these UE 102. For the UE 102 located in coverage bin 233, the terrestrial coverage heat map generator 107 may use measurement data (e.g., through triangulation, RF signal timing and angle of arrival analysis, and/or GPS location data from that UE 102) to correlated the detected UE signal activity with the location of coverage bin 233 and therefore flag coverage bin 233 as a terrestrial coverage available (TCA) coverage bin. Similarly, for the UE 102 located in coverage bin 233, the terrestrial coverage heat map generator 107 may use measurement data (e.g., through triangulation, RF signal timing and angle of arrival analysis, and/or GPS location data from that UE 102) to correlated the detected UE signal activity with the location of coverage bin 234 and therefore flag coverage bin 233 as a terrestrial coverage available (TCA) coverage bin.

Referring to the coverage bins 236 and 237, each of these bins include areas that fall within the coverage area 210 of RAN 203. Coverage bin 237 includes a UE 102, which for the purpose of this example is considered as attached to the HPLMN 108 via RAN 203. When the terrestrial coverage heat map generator 107 aggregates RF signal measurement data and signal metrics from base stations of operator core network 106, it will find UE signal activity (in terms of usage and/or interference) from this UE 102 in coverage bin 236. The terrestrial coverage heat map generator 107 may use measurement data (e.g., through triangulation, RF signal timing and angle of arrival analysis, and/or GPS location data from that UE 102) to correlated the detected UE signal activity with the location of coverage bin 237 and therefore flag coverage bin 237 as a terrestrial coverage available (TCA) coverage bin. Coverage bin 236 does not include an operating UE 102. As such, even though coverage area 210 includes portions of coverage bin 236, the terrestrial coverage heat map generator 107 may not have a reason based on UE signal activity to flag coverage bin 236 as a terrestrial coverage available (TCA) coverage bin. That said, in some embodiments, the terrestrial coverage heat map generator 107 may generate the terrestrial coverage heat map 200 by aggregating RF signal measurement data and signal metrics from base stations of operator core network 106 over a window of time (e.g., an aggregation window), such as over the past 12 hours or 24 hours, for example. As such, the UE 102 shown in may have been previously attached to RAN 203 within coverage bin 236 within that aggregation window. For example, the UE 102 may be in a vehicle travelling on a path that traverses through the area of coverage bins 236 and 237. As such, when the terrestrial coverage heat map generator 107 aggregates RF signal measurement data and signal metrics from base stations of operator core network 106, that data may include: 1) UE signal activity from UE 102 that may be correlated to coverage bin 236, and 2) UE signal activity from that same UE 102 that may be correlated to coverage bin 237. Based on the UE signal activity from the UE 102 collected over the aggregation window, the terrestrial coverage heat map generator 107 may therefore flag both coverage bin 236 and cover bin 237 as a terrestrial coverage available (TCA) coverage bins.

Figure 3:
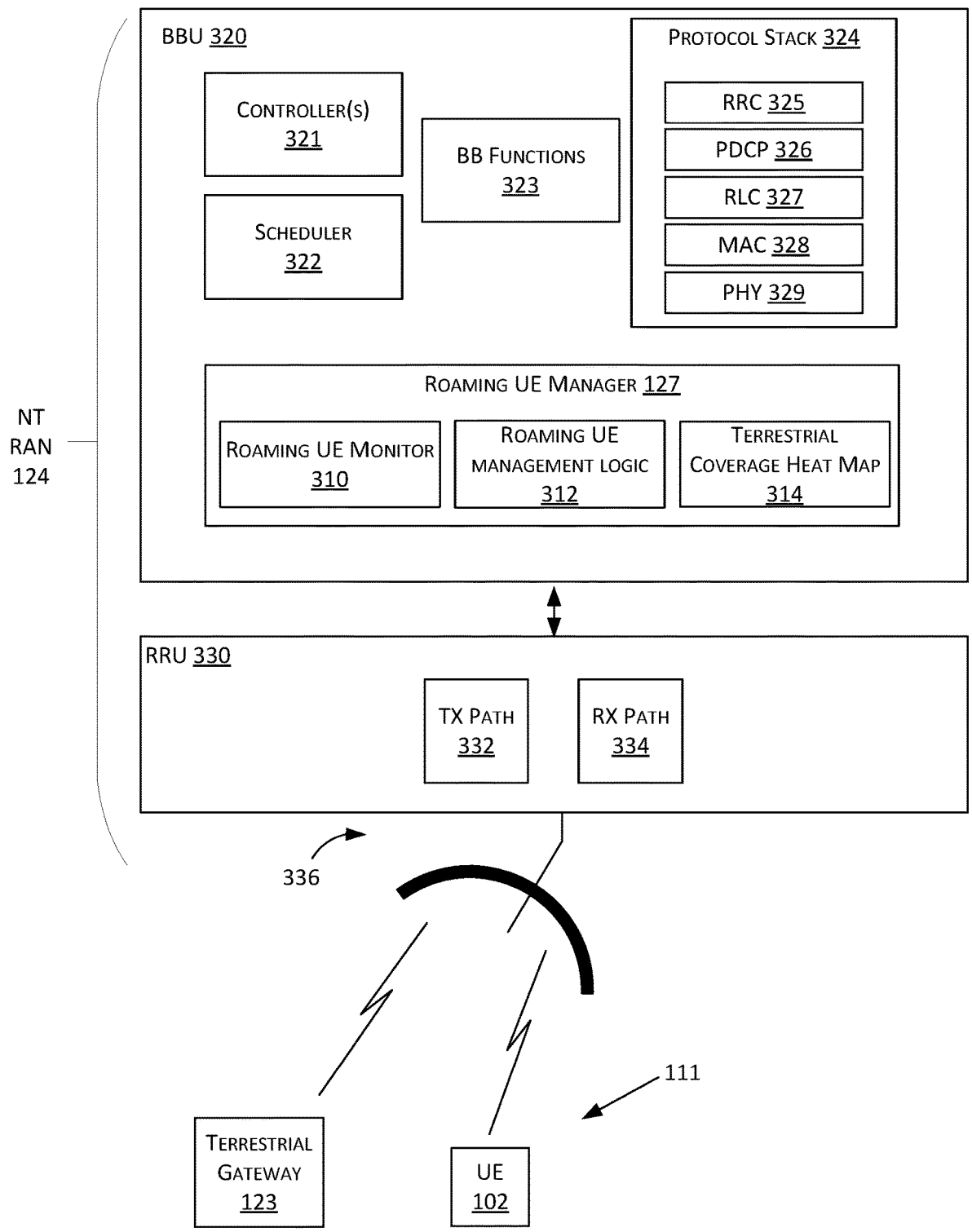
FIG. 3 is diagram illustrating an example of a radio access network for implementing roaming UE management services, in accordance with some embodiments.

Referring now to FIG. 3, FIG. 3 illustrates an example implementation of an NT RAN 124 such as illustrated in FIG. 1. The NT RAN 124 may comprise a baseband unit (BBU) 320 coupled to a least one Remote Radio Unit (RRU) 330 through which the NT RAN 124 serves one or more roaming UE 102 within coverage area 111. In some embodiments, the BBU 320 may comprise the Central Unit (CU) of an open-RAN (ORAN) architecture base station. The BBU 320 may comprise the circuitry and functionality to implement an air interface and Open System Interconnection (OSI) Layer 1, Layer 2 and Layer 3 functions for the air interface. The RRU 330 includes a radio head comprising transmit (TX) path 332 that includes radio transmitter circuitry (such digital-to-analog converters, one or more RF filters, frequency up-converters, and/or a Power Amplifier (PA)) and receive path (RX) 334 that includes radio receiver circuitry (such analog-to-digital converters, one or more RF filters, frequency down converters, and/or a Low Noise Amplifier (LNA).) The TX path 332 and RX path 334 may be coupled to one or more antennas 336 by an appropriate coupler (such as a duplexer, for example). In some embodiments, the functions of the BBU 320 and RRU 330 may be distinct components within the NT RAN 124, or at least partially integrated as a single component.

The antennas 336 may be physically mounted to the structure of a satellite hosting the NT RAN 124. Downlink RF signals are radiated into coverage area 111 via TX path 332 and antenna(s) 336 for reception by the UE(s) 102. Uplink RF signals transmitted by the UE(s) 102 are received via the antenna(s) 336 and RX path 334. The NT RAN 124 may communicate with the UE(s) 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the NT RAN 124 may optionally support multiple air interfaces and/or multiple wireless operators.

As depicted in FIG. 3, the BBU 320 may comprise one or more controllers 321 comprising a processor coupled to a memory and programed to perform one or more of the functions of the NT RAN 124 described herein. The roaming UE manager 127 is an example of function on the NT RAN 124 that may be executed by the one or more controllers 321. In some embodiments, one or more of the base station functions described herein may be executed by one or more controllers in a distributed manner utilizing one or more network functions orchestrated or otherwise configured to execute utilizing processors and memory of the one or more controllers. For example, where NT RAN 124 comprises a gNodeB, the functions of the BBU 320 may be distributed between functional units comprising a Centralized Unit (CU) and at least one Distributed Unit (DU). As such, one or more functions of the base station described herein may be implemented by discrete physical devices or via virtual network functions. It should also be noted that in some embodiments, elements of the roaming UE manager 127 may be implemented at least in part on a terrestrial node or network server of a communications network (such as server 129 for example) instead of, or in addition to, on-board the NT RAN 124.

The BBU 320 is responsible for, among other things, digital baseband signal processing, for example to process uplink and downlink baseband signals, shown in FIG. 3 as Baseband (BB) function(s) 323. The BBU 320 further includes a scheduler 322 through which the BBU 320 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 322 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink (UL) and downlink (DL) communications traffic between the BBU 320 and UE 102 are processed through a protocol stack 324 implemented by the BBU 320 that comprises various protocol stack layers. In the example embodiment illustrated in FIG. 3, the protocol stack 324 includes a radio resource control (RRC) layer 325, packet data convergence protocol (PDCP) layer 326, radio link control (RLC) layer 327, medium access control (MAC) layer 328, and physical layer (PHY) 329. The MAC layer 328 is responsible, for example, for mapping between logical channels of the RLC layer 327 and transport channels of the PHY layer 329. MAC layer 328 may also perform functions such as, but not limited to, multiplexing of MAC service data units (SDUs) from logical channels onto transport blocks (TB) to be delivered to the PHY layer 329 on transport channels, de-multiplexing of MAC SDUs from one or different logical channels from transport blocks (TB) delivered from the PHY layer 329 on transport channels, scheduling information reporting, error correction through hybrid automatic repeat requests (HARQ), priority handling between UEs by means of dynamic scheduling, priority handling between logical channels of one UE, and logical channel prioritization.

As already mentioned above, in some embodiments the BBU 320 implements the roaming UE manager 127. For example, the roaming UE manager 127 may be at least in part executed by the controller 321 of the BBU 220. The roaming UE manager 127 may operate in conjunction with other operations executed by the BBU 220 to implement roaming UE management services that address the problem of delays in transferring roaming UE 102 from NT RAN 124 to a terrestrial base station (such as RAN 103) when wireless services of those terrestrial base stations become available to the roaming UE.

As shown in FIG. 2, the roaming UE manager 127 may obtain from the network server 129 at least a segment of the terrestrial coverage heat map 109. For example, the roaming UE manager 127 may obtain a segment of the terrestrial coverage heat map 109 that corresponds to the coverage area 111 of the NT RAN 124. That segment of the terrestrial coverage heat map 109 obtained from network server 129 may be stored to a memory of the NT RAN 124 as a terrestrial coverage heat map 314. The roaming UE manager 127 may reference terrestrial coverage heat map 314 to determine when a UE 102 attached to the NT RAN 124 is located in an area where coverage from a terrestrial network may be available. In some embodiments, the roaming UE manager 127 may periodically query the network server 129 to obtain updates to the terrestrial coverage heat map 314 (e.g., based on updates to the terrestrial coverage heat map 109 generated by the terrestrial coverage heat map generator 107). In some embodiments, the network server 129 may periodically push updates to the terrestrial coverage heat map 314 to the roaming UE manager 127.

As shown in FIG. 3, the roaming UE manager 127 may include a roaming UE monitor 310 and roaming UE management logic 312. In some embodiments, the roaming UE monitor 310 may determine and track the location of roaming UE attached to the NT RAN 124. For example, in some embodiments, the roaming UE monitor 310 (or other base station function performed by the NT RAN 124) may detect when a roaming UE 102 attaches to the NT RAN 124, and collect measurement data from the roaming UE 102 that includes navigation signal data received by the roaming UE 102 from satellites of the non-terrestrial network 142 and/or global navigation satellite system (GNSS) satellites (such as global positioning system (GPS) satellites, for example.). Based on triangulating satellite signals, the roaming UE monitor 310 may compute coordinates for the location of a roaming UE 102 that may be used by the roaming UE management logic 312 to correlate that roaming UE 102 to a coverage bin of the terrestrial coverage heat map 314. Using the measurement data that includes satellite signal data may be useful, for example, for determining the location of roaming UE 102 that are attached to the NT RAN 124 in idle mode. In some embodiments, the roaming UE monitor 310 (or other base station function performed by the NT RAN 124) may instead, or additionally, use measurement report data from a connected mode roaming UE 102 attached to the NT RAN 124. A connected mode UE 102 may be measuring RF signals from its environment, including RF signals from different radio access technology layers and from different satellites of the non-terrestrial network 142. For example, a measurement report from a connected mode UE 102 may include, in addition to the measurement data that may be available from an idle mode UE, measurements of signals corresponding to different radio access technology layers, measurements of Reference Signal Received Power (RSRP), Reference Signal Received Quality (RSRQ), Received Signal Strength Indicator (RSSI), Synchronization Signal reference signal received power (SS-RSRP) and/or other measurement that may be used to compute coordinates for the location of a roaming UE 102, based on triangulating satellite signals measured by the UE 102. The computed coordinates for the connected mode roaming UE 102 may be used by the roaming UE management logic 312 to correlate that roaming UE 102 to a coverage bin of the terrestrial coverage heat map 314. In some embodiments, a UE 102 may itself compute coordinates of its location (e.g., based on GNSS navigation signals) and those coordinates communicated to the roaming UE monitor 310. In some embodiments, the roaming UE monitor 310 may use UE computed coordinates, for example, to validate and/or adjust coordinates computed by the roaming UE monitor 310 (or other base station function). In some embodiments, the roaming UE monitor 310 may individually track the location of roaming UE 102 attached to NT RAN 124 over time, and report location updates to the UE management logic 312.

The UE management logic 312 implements roaming visitor management based on roaming UE 102 locations determined by the roaming UE monitor 310, and the terrestrial network available flag status indications of coverage bins of the terrestrial coverage heat map 314. These roaming visitor management tasks may be executed for individual roaming UE on a periodic basis.

For example, UE management logic 312 may periodically correlate a current location of a roaming UE 102, as determined by the roaming UE 102, with the terrestrial coverage heat map 314. If the location of the roaming UE 102 is determined to correlate with the area of a coverage bin that is not flagged as terrestrial network available, that UE 102 may be permitted to remain actuated to NT RAN 124. When the location of the roaming UE 102 is determined to correlate with the area of a coverage bin that is flagged as terrestrial network available, the UE management logic 312 may attempt to trigger the roaming UE to initiate a PLMN search, to prompt the roaming UE 102 to move to a higher priority PLMN, since the terrestrial coverage heat map 314 indicates that such a higher priority PLMN is potentially available.

To trigger the roaming UE to initiate a PLMN search, the UE management logic 312 may determine whether a roaming UE 102 is attached to the NT RAN 124 in connected mode or in idle mode. For a roaming UE 102 attached in connected mode, the UE management logic 312 may initiate a request message to the UE 102 to perform a PLMN search for a PLMN of higher priority than the VPLMN 128. When the UE 102 reports to the NT RAN 124 that the PLMN search did identify a higher priority PLMN, the NT RAN 124 may proceed to release the connection with the UE 102, which may cause the UE 102 to proceed with a procedure to attach to the terrestrial base station for the identified higher priority PLMN.

For a roaming UE 102 attached in idle mode, the UE management logic 312 may instead push a carrier configuration update message to the roaming UE 102, which may cause the UE 102 to initiate a PLMN search to attempt to find a base station for its HPLMN (e.g., HPLMN layer 108) in order to complete the carrier configuration update. For example, the UE 102 may be configured to contact, through its HPLMN layer 108, a configuration server 115 that provisions carrier configuration updates to UE 102 subscribed to the operator core network 106. To initiate that contact with configuration server 115, the UE 102 that receives the carrier configuration update message pushed by NT RAN 124 may initiate a PLMN search. When the UE 102 reports to the NT RAN 124 that the PLMN search did identify a higher priority PLMN, the NT RAN 124 may instruct the UE 102 to proceed with a procedure to attach to the terrestrial base station for the identified higher priority PLMN.

With these embodiments, the operation of the NT RAN 124 is improved because the roaming UE management services provided by the generation of a terrestrial coverage heat map, and the utilization of that terrestrial coverage heat map by the roaming UE manager, permit the NT RAN 124 to redirect roaming UE to attach to a terrestrial base station based on a detected availability of terrestrial coverage in an area where the roaming UE is located. The roaming UE management services realizes an improvement to the ability of NT RAN 124 to perform capacity management because its resources (e.g., processing resources, power, and/or satellite link bandwidth) are conserved for the use of UE that have no terrestrial network alternative, and/or need it most. Moreover, increased efficiencies in the backhaul network may be realized. For example, eliminating undue delay of a UE 102 to transfer from VPLMN 128 to HPLMN 108 may eliminate unnecessary traffic on the S8 interface between operator core networks 106 and 126. As previously discussed, roaming UE management services may be implemented at the radio access technologies layer using different terrestrial coverage heat maps and/or a composite terrestrial coverage heat map, that indicate UE of terrestrial network resources for different radio access technology layers. Moreover, the base station functions of the NT RAN 124 may be configured to override the decisions of the roaming UE manager to transfer a UE to a non-terrestrial base station, for example, based on a classification type of the UE 102 and/or a type of call session. For example, the NT RAN 124 may override the roaming UE manager for emergency calls, SOS calls, and/or other calls recognized as priority calls by the NT RAN 124.

To further illustrate operation of the roaming UE manager 127 based on a terrestrial coverage heat map 200, reference is again made FIG. 2 and the UE 102 located in coverage bin 235. For this example, UE 102 is a mobile UE that is leaving the area of coverage bin 235 and entering the area of coverage bin 237. The roaming UE monitor 310 tracks the movement of the UE 102, periodically re-computing coordinates of the UE's location as it travels. The roaming UE management logic 312 correlates the new location of UE 102 with the terrestrial coverage heat map 200 and determines that the UE 102 is now located within a coverage bin 237 that is flagged as terrestrial network available, and therefore triggers the UE 102 to initiate a PLMN search. Through the measurements of RF signals, the UE 102 may identify the RAN 203 as a potential terrestrial target base station for UE transfer (e.g., a UE handover operation or a UE re-direction operation) based on RF signal quality and compatibility between the frequency bands available from RAN 203 and those used by UE 102. In some embodiments, the UE 102 may obtain measurement data that includes RF channel quality measurements of RF signals of RAN 203 (and potentially may measure RF signals of one or more other neighboring base stations). Example quality measurements may include, but are not limited to, Reference Signal Received Power (RSRP), Reference Signal Received Quality (RSRQ), Received Signal Strength Indicator (RSSI), Synchronization Signal reference signal received power (SS-RSRP), Channel State Information reference signal received power (CSI-RSRP), and/or other signal quality measurements. UE 102 may determine, for example, an absolute radio-frequency channel number (ARFCN), E-UTRA Absolute Radio Frequency Channel Number (EARFCN), and/or Physical Cell ID (PCI) information corresponding to RAN 203. Based on signals transmitted from the RAN 203, the UE 102 may further identify one or more PLMN identifiers for one or more PLMN that are indicated (e.g., by its SIM) as having a higher priority than the priority of VPLMN 128 (e.g., such as HPLMN 108). The UE 102 may send a measurement report to the roaming UE manager 127 or other base station function of the NT RAN 124, and based on the measurement report indicating that the UE 102 has identified a compatible base station RAN 203, the NT RAN 124 may instruct the UE 102 to proceed with a UE transfer operation (e.g., a UE handover operation or a UE re-direction operation) to attach to RAN 203.

Figure 4:
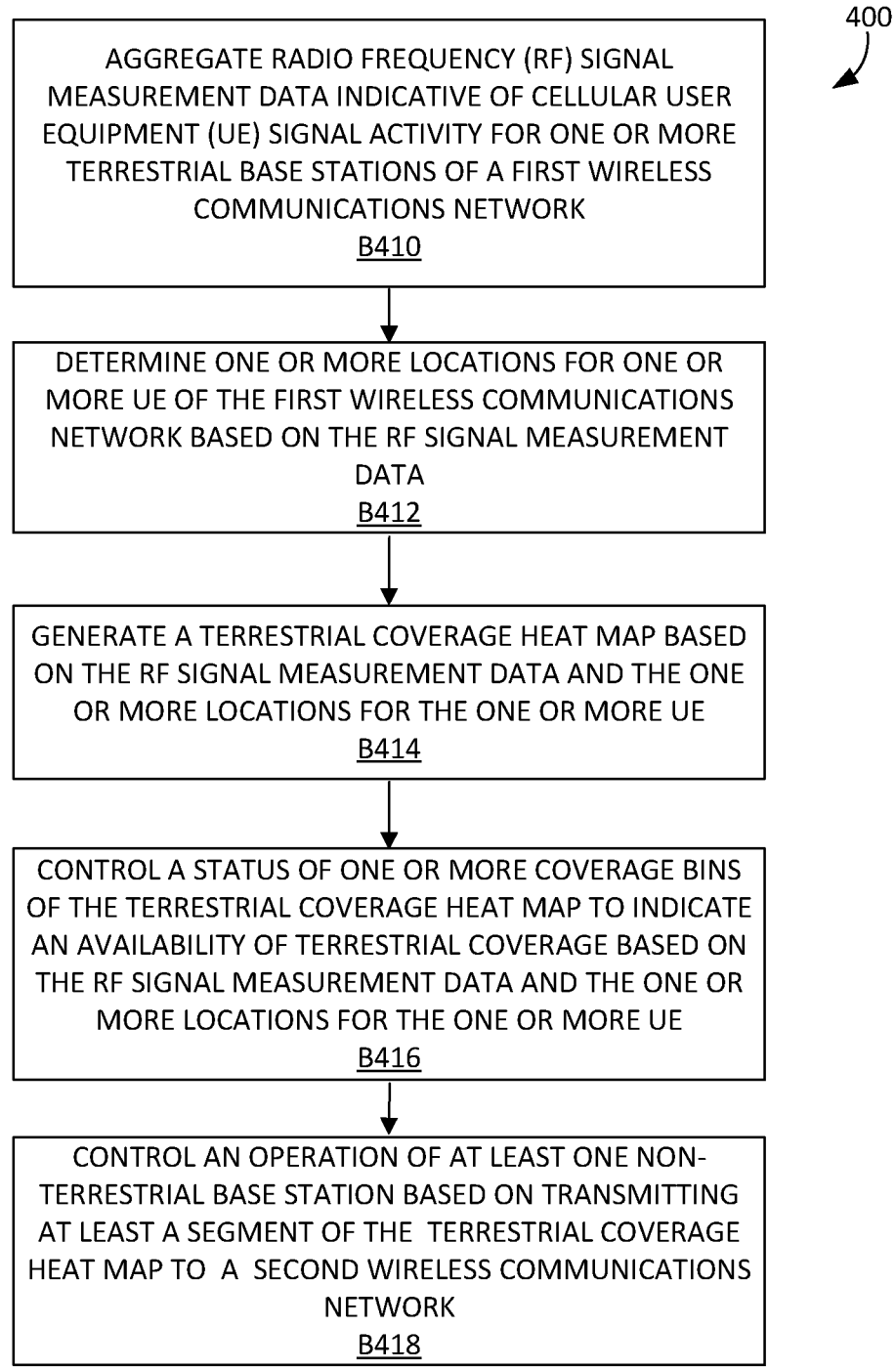
FIG. 4 is flow chart illustrating a method for roaming UE management services, in accordance with some embodiments.

FIG. 4 is a flow chart illustrating a method 400 for roaming UE management services according to an embodiment. It should be understood that the features and elements described herein with respect to the method of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa. In some embodiments, elements of method 400 may be implemented utilizing a terrestrial coverage heat map generator executing on network node or server of a wireless telecommunications system operator core network, such as network server 112 discussed herein.

Method 400 at block B410 includes aggregating radio frequency (RF) signal measurement data indicative of cellular user equipment (UE) signal activity for one or more terrestrial base stations of a first wireless communications network. The RF signal measurement data may represent one or both of UE network usage data and signal interference data. In some embodiments, the RF signal measurement data includes signal metrics collected from at least one of the one or more terrestrial base stations of a first wireless communications network, or the operator core network of the first wireless communications network. For example, signal metrics may include key performance indicator (KPI) measurements, for example, based on call trace data, per call measurement data (PCMD), active session statistics, RF signal measurement reports and/or voice quality metrics, obtained from the operator core network 106 and from the UE 102, for one or more radio access technologies layers. In some embodiments, the RF signal measurement data may be aggregated over a predefined aggregation window of time.

Method 400 at block B412 includes determining one or more locations for one or more UE coupled to the one or more terrestrial base stations of the first wireless communications network based on the RF signal measurement data. In some embodiments the locations of the one or more UE may be determined using RF signal triangulation techniques, such as by measuring the timing and angle of arrival of an RF signal from a UE.

Method 400 at block B414 includes generating a terrestrial coverage heat map based on the RF signal measurement data and the one or more locations for the one or more UE. The terrestrial coverage heat map may comprise a geo-spatial coverage grid that includes a plurality of individual coverage bins. The individual coverage bins may each correspond to a geographical region of the Earth's surface. Coverage bins may be defined, for example, based on a geographical coordinate of a coverage bin center point (e.g., latitude and longitude), and a radius that indicates how far the boundary of a coverage bin extends from the center point. In some embodiments, a coverage bin may comprise the shape of a regular polygon, such as but not limited to a hexagonal polygon. For example, the geo-special coverage grid may comprise a hexagonal grid comprising a plurality of hexagonal polygons each corresponding to a different geographical region of the Earth's surface.

Method 400 at block B416 includes controlling a status of one or more coverage bins of the terrestrial coverage heat map to indicate an availability of terrestrial coverage based on the RF signal measurement data and the one or more locations for the one or more UE. For example, in some embodiments, the status may be controlled based on computing a coverage confidence value for individual coverage binds of the one or more coverage bins based on the RF signal measurement data. In some embodiments, the availability of terrestrial coverage for the one or more coverage bins may be determined by executing a classification algorithm to determine the availability of terrestrial coverage based at least on the RF signal measurement data. In some embodiments, the classification algorithm may comprise an artificial intelligence model trained to infer the availability of terrestrial coverage for the one or more coverage bins. In some embodiments, the terrestrial coverage heat map generated based on the RF signal measurement data indicates an availability of terrestrial coverage for a plurality of individual radio access technologies layers supported by the one or more terrestrial base stations.

Method 400 at block B418 includes controlling an operation of at least one non-terrestrial base station based on transmitting at least a segment of the terrestrial coverage heat map to a second wireless communications network. For example, the operation of the non-terrestrial base station may be controlled by transmitting at least a segment of the terrestrial coverage heat map to a network server of the second wireless communications network accessible to the at least one non-terrestrial base station. In some embodiments, the operation of the least one non-terrestrial base station is controlled to trigger one or more roaming UE to initiate a public land mobile network (PLMN) search based at least in part on the terrestrial coverage heat map. From the PLMN search, the roaming UE may identify a terrestrial wireless communication base station having a PLMN of higher priority than a PLMN of the at least one non-terrestrial base station. The roaming UE may detach from the non-terrestrial base station and attach to the terrestrial wireless communication base station having the higher priority PLMN.

Figure 5:
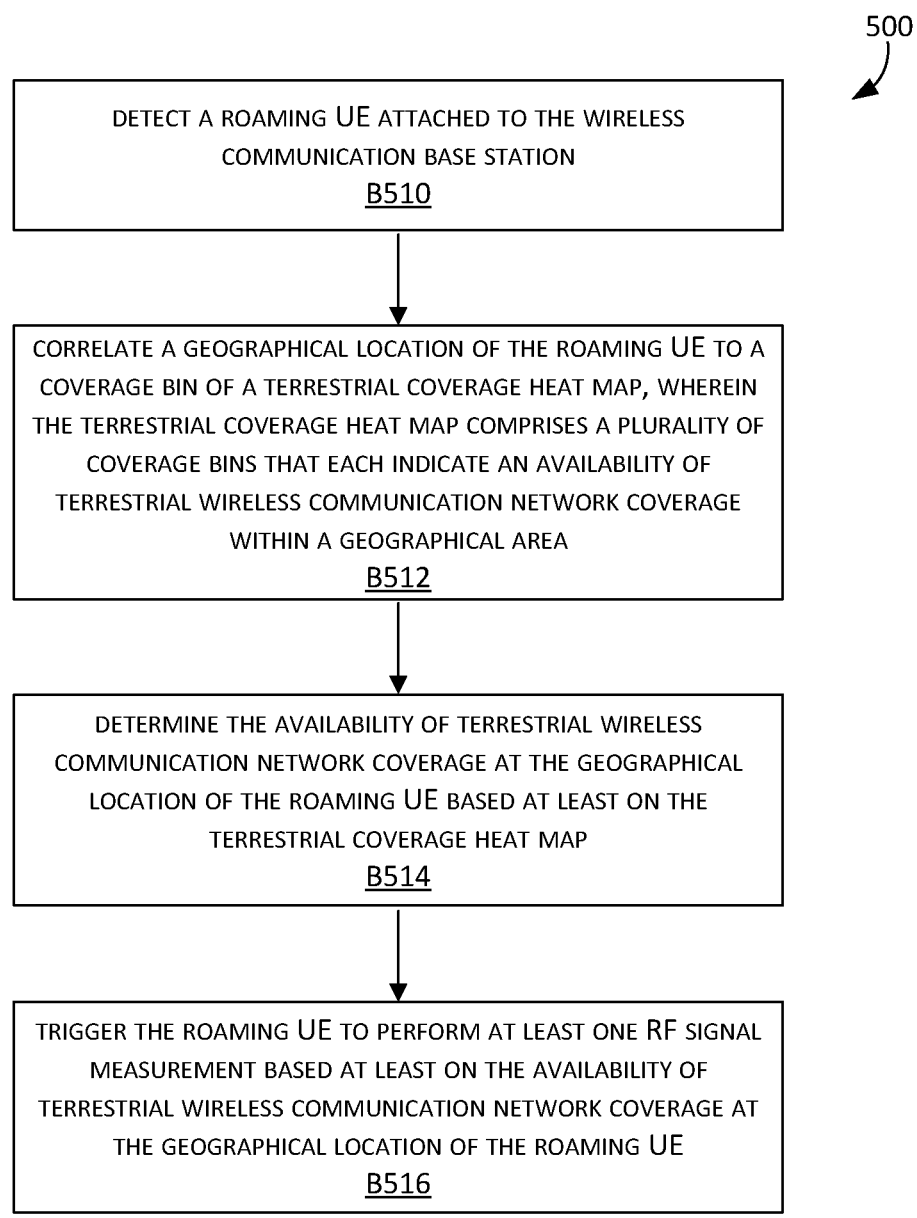
FIG. 5 is flow chart illustrating another method for roaming UE management services, in accordance with some embodiments.

FIG. 5 is a flow chart illustrating a method 500 for roaming UE management services according to an embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 may be implemented utilizing a roaming UE manager executing on a non-terrestrial base station, such as NT RAN 124 discussed herein. In some embodiments, elements of method 500 may be implemented utilizing a roaming UE manager executed on a terrestrial node or network server of a communications network, such as server 129 for example.

Method 500 at block B510 includes detecting a roaming UE attached to the wireless communication base station. In some embodiments, the wireless communication base station system is comprised in a satellite vehicle. For example, the wireless communication base station system may be comprised in an Earth orbiting satellite vehicle. In some embodiments, the roaming UE may attach to a VPLMN provided by a non-terrestrial base station of a non-terrestrial network. The non-terrestrial base station may function as an access node via which the roaming UE can wirelessly access services of the VPLMN and/or reach services of the operator core network of the roaming UE's HPLMN, such as telecommunications and data connectivity.

Method 500 at block B512 includes correlating a geographical location of the roaming UE to a coverage bin of a terrestrial coverage heat map, wherein the terrestrial coverage heat map comprises a plurality of coverage bins that each indicate an availability of terrestrial wireless communication network coverage within a geographical area. For example, in some embodiments, a roaming UE may be detected when it attaches to the wireless communication base station. Measurement data may be collected from the roaming UE that includes navigation signal data received by the roaming UE from satellites of a non-terrestrial network and/or global navigation satellite system (GNSS) satellites (such as global positioning system (GPS) satellites, for example.). Based on triangulating satellite signals, coordinates may be computed for the location of a roaming UE, and those coordinates used to correlate the roaming UE with a coverage bin of the terrestrial coverage heat map. In some embodiments, measurement report data from a connected mode roaming UE may be used. A connected mode roaming UE may be measuring RF signals from its environment, including RF signals from different radio access technology layers and from different satellites of a non-terrestrial network. For example, a measurement report from a connected mode roaming UE may include, in addition to the measurement data that may be available from an idle mode UE, measurements of signals corresponding to different radio access technology layers, measurements of Reference Signal Received Power (RSRP), Reference Signal Received Quality (RSRQ), Received Signal Strength Indicator (RSSI), Synchronization Signal reference signal received power (SS-RSRP) and/or other measurement that may be used to compute coordinates for the location of a roaming UE, for example, by triangulating satellite signals measured by the UE. The computed coordinates for the connected mode roaming UE 102 may be used to correlate that roaming UE to a coverage bin of the terrestrial coverage heat map.

Method 500 at block B514 includes determining the availability of terrestrial wireless communication network coverage at the geographical location of the roaming UE based at least on the terrestrial coverage heat map. For example, coverage bins of the geo-spatial coverage grid where terrestrial network coverage is detected may be flagged as terrestrial coverage available (TCA) coverage bins.

Method 500 at block B516 includes triggering the roaming UE to perform at least one RF signal measurement based at least on the availability of terrestrial wireless communication network coverage at the geographical location of the roaming UE. If the coverage bin correlating to the location of the roaming UE is not flagged by the terrestrial coverage heat map as having terrestrial coverage available, the roaming UE may be permitted to maintain an attachment to the to the wireless base station. In some embodiments, when the roaming UE moves into a location corresponding to a coverage bin that is flagged as having terrestrial coverage available, one or more operations may be executed to trigger the roaming UE to proceed to initiate a PLMN search. If the UE reports that it detects a higher priority PLMN than the VPLMN of the wireless base station it is currently attached to, the UE is instructed to perform an attach procedure to the identified higher priority PLMN. In some embodiments, the method may include determining whether the roaming UE is attached to the wireless communication base station in a connected mode or in an idle mode. When the roaming UE is determined to be in the connected mode, it may be trigger to perform the at least one RF signal measurement by sending the UE a request message to perform a search. When the roaming UE is determined to be in the idle mode, it may be triggered to perform the at least one RF signal measurement based on pushing a carrier configuration update message to the roaming UE that causes the roaming UE to initiate a search, when the roaming UE is determined to be in the idle mode. In some embodiments, the roaming UE may be triggered to perform a PLMN search, based at least on the availability of terrestrial wireless communication network coverage at the geographical location of the roaming UE indicated by the terrestrial coverage heat map. In some embodiments, the method may initiate a transfer of the roaming UE from the wireless communication base station to the terrestrial wireless communication base station based on the PLMN search identifying a terrestrial wireless communication base station having a PLMN of higher priority than a PLMN of the wireless communication base station.

Figure 6:
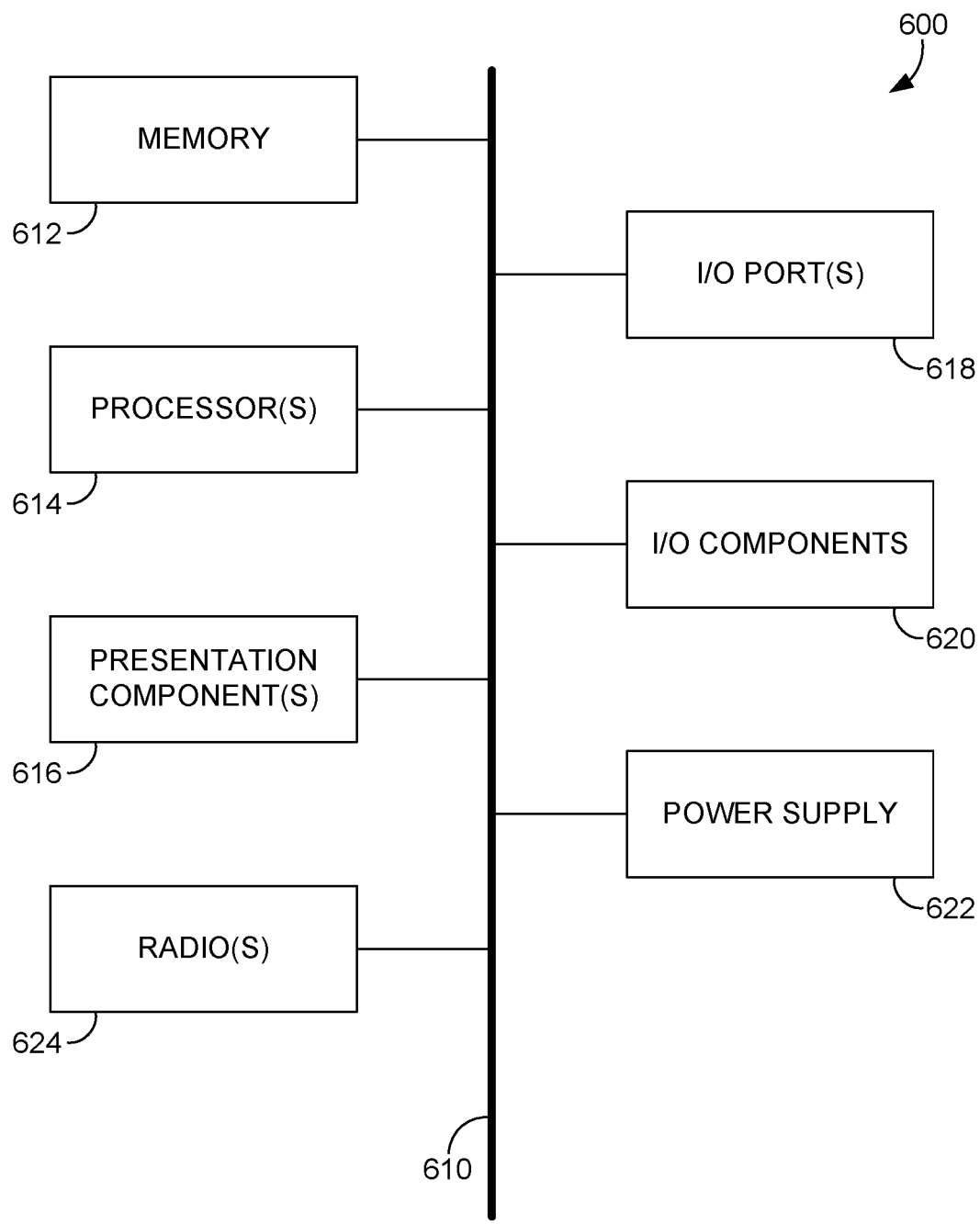
FIG. 6 is diagram illustrating an example computing environment, in accordance with some embodiments.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples one or more of the following devices: memory 612, one or more processors 614, one or more presentation components 616, input/output (I/O) ports 618, I/O components 620, power supply 622, and radio 624. Bus 610 represents what may be one or more busses (such as an address bus, data bus, or combination thereof). The components of FIG. 6 are shown with lines for the sake of clarity. However, it should be understood that the functions performed by one or more components of the computing device 600 may be combined or distributed amongst the various components. For example, a presentation component such as a display device may be one of I/O components 620. In some embodiments, a base station, RAN and/or network server node, implementing one or more aspects of a roaming UE manager and/or a terrestrial coverage heat map generator, may comprise a computing device 600. In some embodiments, a UE, such as UE 102, may comprise a computing device such as computing device 400.

The processors of computing device 600, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device." In some embodiments, one or more aspects of terrestrial coverage heat map generator 107 and/or roaming UE manager 127 may be implemented at least in part by code executed by the one or more processors(s) 614 using memory 612. In some embodiments, a terrestrial coverage heat map, such as terrestrial coverage heat map 109 and/or terrestrial coverage heat map 314 may be stored in a memory 612 of the computing device 600.

Computing device 600 typically includes a variety of computer-readable media. Computer-readable media can be any available non-transient media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable non-transient media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes tangible, non-transient, computer-storage media in the form of volatile and/or nonvolatile memory. Memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 may present data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, joystick, game pad, satellite dish, scanner, printer, wireless device, etc.

Radio(s) 624 represents a radio that facilitates communication with a wireless telecommunications network. For example, radio(s) 624 may be used to establish communications with a UE and/or a RAN. Illustrative wireless telecommunications technologies include CDMA, GPRS, TDMA, GSM, 4G LTE, 3GPP 5G, and other 3GPP technologies. In some embodiments, the radio(s) 624 comprise circuits that implement a radio module of a UE 102, a RAN 103, and/or an NT RAN 124, as described herein. Radio(s) 624 may additionally or alternatively facilitate other types of non-3GPP wireless communications including Wi-Fi, WiMAX, and/or other VOIP communications. In some embodiments, radio(s) 624 may support multi-modal connections that include a combination of 3GPP radio technologies (e.g., 4G, 5G and/or 6G) and/or non-3GPP radio technologies. As can be appreciated, in various embodiments, radio(s) 624 can be configured to support multiple technologies and/or multiple radios can be utilized to support multiple technologies. In some embodiments, the radio(s) 624 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 7:
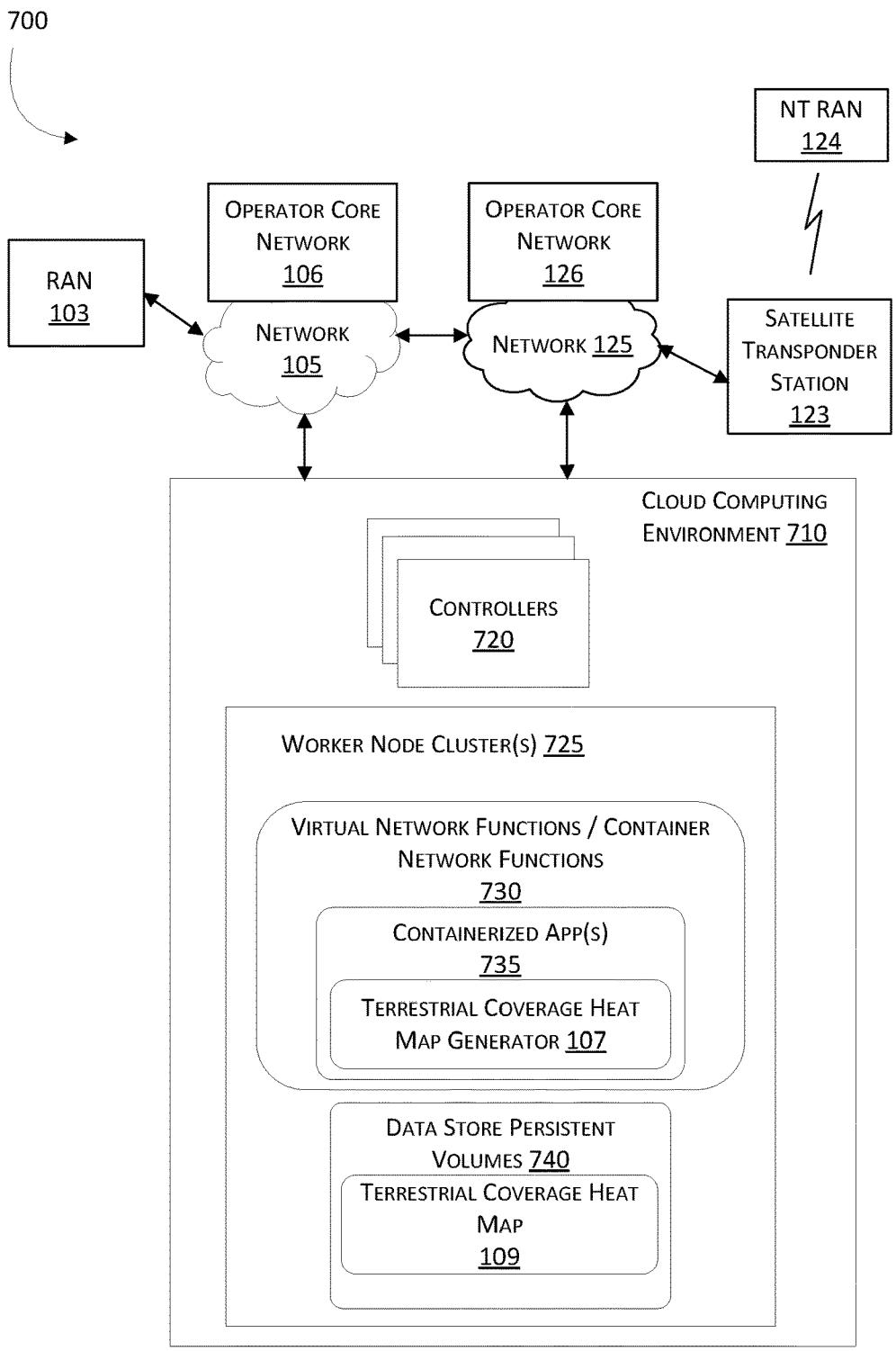
FIG. 7 is diagram illustrating an example cloud computing environment, in accordance with some embodiments.

Referring to FIG. 7, a diagram is depicted generally at 700 of an exemplary cloud computing environment 710 for implementing one or more aspects of roaming UE management services, such as described herein. Cloud computing environment 710 is but one example of a suitable cloud-computing environment and is not intended to suggest any limitation as to the scope of use or functionality of the embodiments presented herein. Neither should cloud-computing environment 710 be interpreted as having any dependency or requirement relating to any one or combination of components illustrated. In some embodiments, the cloud-computing environment 710 is executed within an operator core network 106 or 126, a node of core network edge 105 or 125, or otherwise coupled to the core network edge(s) or operator core network(s).

Cloud computing environment 710 includes one or more controllers 720 comprising one or more processors and memory. The cloud computing environment 710 may include one or more data store persistent volumes 740. The controllers 720 may comprise servers of one or more data centers. In some embodiments, the controllers 720 are programmed to execute code to implement at least one or more aspects of the terrestrial coverage heat map generator 107. For example, in one embodiment the terrestrial coverage heat map generator 107 may be implemented, at least in part, as one or more virtual network functions (VNFs)/container network functions (CNFs) 730 running on a worker node cluster 725 established by the controllers 720. In some embodiments terrestrial coverage heat map 109 may be stored using the one or more data store persistent volumes 740. The cluster of worker nodes 725 may include one or more orchestrated Kubernetes (K8s) pods that realize one or more containerized applications 735 for the terrestrial coverage heat map generator 107. In other embodiments, another orchestration system may be used to realize the terrestrial coverage heat map generator 107. For example the worker nodes 725 may use lightweight Kubernetes (K3s) pods, Docker Swarm instances, and/or other orchestration tools. In some embodiments, one or more elements of the RAN 103 and/or NT RAN 124, and/or other elements of the terrestrial network 140 and/or non-terrestrial network 142, may be coupled to the controllers 720 of the cloud-computing environment 710.

In various alternative embodiments, system and/or device elements, method steps, or example implementations described throughout this disclosure (such as the UE, core network edge, operator core network, RAN, base stations, access nodes, terrestrial coverage heat map generator, roaming UE manager, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for roaming user equipment management services, the system comprising:
one or more processors; and
one or more computer-readable media storing computer-usable instructions that, when executed by the one or more processors, cause the one or more processors to:
aggregate radio frequency (RF) signal measurement data indicative of cellular user equipment (UE) signal activity for one or more terrestrial base stations of a first wireless communications network;
determine one or more locations for one or more UE coupled to the one or more terrestrial base stations of the first wireless communications network, based on the RF signal measurement data;
generate a terrestrial coverage heat map based on the RF signal measurement data and the one or more locations for the one or more UE;
control a status of one or more coverage bins of the terrestrial coverage heat map to indicate an availability of terrestrial coverage based on the RF signal measurement data and the one or more locations for the one or more UE; and control an operation of at least one non-terrestrial base station based on transmitting at least a segment of the terrestrial coverage heat map to a second wireless communications network.

2. The system of claim 1, the one or more processors to: compute a coverage confidence value for individual coverage bins of the one or more coverage bins based on the RF signal measurement data.

3. The system of claim 1, wherein the RF signal measurement data includes signal metrics collected from at least one of:
the one or more terrestrial base stations of the first wireless communications network; or
an operator core network of the first wireless communications network.

4. The system of claim 1, wherein the RF signal measurement data represents at least one of UE network usage data or signal interference data.

5. The system of claim 1, the one or more processors to: execute a classification algorithm to determine the availability of terrestrial coverage for the one or more coverage bins of the terrestrial coverage heat map based at least on the RF signal measurement data.

6. The system of claim 5, wherein the classification algorithm comprises an artificial intelligence model trained to infer the availability of terrestrial coverage for the one or more coverage bins.

7. The system of claim 1, the one or more processors to: generate the terrestrial coverage heat map based on the RF signal measurement data to indicate the availability of terrestrial coverage for a plurality of individual radio access technologies layers supported by the one or more terrestrial base stations.

8. The system of claim 1, the one or more processors to: control the operation of the at least one non-terrestrial base station to trigger one or more roaming UE to initiate a public land mobile network (PLMN) search based at least in part on the terrestrial coverage heat map.

9. The system of claim 1, the one or more processors to: aggregate the RF signal measurement data indicative of cellular user equipment UE signal activity over a predefined aggregation window of time.

10. The system of claim 1, the one or more processors to: transmit the at least the segment of the terrestrial coverage heat map to a network server of the second wireless communications network accessible to the at least one non-terrestrial base station.

11. A wireless communication base station, the base station comprising:
at least one controller comprising one or more processing units to execute one or more wireless communication base station functions, wherein the wireless communication base station is configured to communicate with one or more user equipment (UE) over one or both of uplink (UL) radio frequency (RF) signals and downlink (DL) RF signals, the one or more processing units to further execute operations comprising:
detect a roaming UE attached to the wireless communication base station;
correlate a geographical location of the roaming UE to a coverage bin of a terrestrial coverage heat map, wherein the terrestrial coverage heat map comprises a plurality of coverage bins that each indicate an availability of terrestrial wireless communication network coverage within a geographical area;
determine the availability of terrestrial wireless communication network coverage at the geographical location of the roaming UE based at least on the terrestrial coverage heat map; and
trigger the roaming UE to perform at least one RF signal measurement based at least on the availability of terrestrial wireless communication network coverage at the geographical location of the roaming UE.

12. The base station of claim 11, wherein the wireless communication base station is comprised in a satellite vehicle.

13. The base station of claim 12, wherein the wireless communication base station is comprised in an Earth orbiting satellite vehicle.

14. The base station of claim 11, the operations further comprising:
determine whether the roaming UE is attached to the wireless communication base station in a connected mode or in an idle mode.

15. The base station of claim 14, the operations further comprising:
trigger the roaming UE to perform the at least one RF signal measurement based on a request message to perform a search, when the roaming UE is determined to be in the connected mode.

16. The base station of claim 14, the operations further comprising:
trigger the roaming UE to perform the at least one RF signal measurement based on pushing a carrier configuration update message to the roaming UE that causes the roaming UE to initiate a search, when the roaming UE is determined to be in the idle mode.

17. The base station of claim 11, the operations further comprising:
trigger the roaming UE to perform a public land mobile network (PLMN) search based at least on the availability of terrestrial wireless communication network coverage at the geographical location of the roaming UE.

18. The base station of claim 12, the operations further comprising:
initiate a transfer of the roaming UE from the wireless communication base station to a terrestrial wireless communication base station based on the PLMN search identifying the terrestrial wireless communication base station having a PLMN of higher priority than a PLMN of the wireless communication base station.

19. A method for roaming user equipment management services for a wireless communications network, the method comprising:
obtain a terrestrial coverage heat map comprising a plurality of coverage bins that each indicate an availability of terrestrial wireless communication network coverage within a geographical area;
correlate a geographical location of a roaming user equipment (UE) to a coverage bin of the terrestrial coverage heat map;
determine the availability of terrestrial wireless communication network coverage at the geographical location of the roaming UE based at least on the terrestrial coverage heat map; and
cause the roaming UE to detach from a first base station and attach to a second base station based at least in part on the availability of terrestrial wireless communication network coverage at the geographical location of the roaming UE.

20. The method of claim 19, further comprising:
aggregate radio frequency (RF) signal measurement data indicative of cellular user equipment (UE) signal activity for one or more terrestrial base stations of a wireless communications network;
determine one or more locations for one or more UE coupled to the one or more terrestrial base stations based on the RF signal measurement data; and
generate the terrestrial coverage heat map based on the RF signal measurement data and the one or more locations for the one or more UE.

\* \* \* \* \*